(12) United States Patent
Gnanamgari et al.

(10) Patent No.: US 7,512,891 B2
(45) Date of Patent: Mar. 31, 2009

(54) METHOD FOR LOCAL REGISTRATION, ENROLLMENT, AND INTERACTION WITH MULTIPLE-USER INFORMATION DISPLAY SYSTEMS BY COORDINATING VOICE AND OPTICAL INPUTS

(75) Inventors: Sakunthala Gnanamgari, Devon, PA (US); Jacqueline Dacre Smith, Lee Center, NY (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 520 days.

(21) Appl. No.: 11/094,551

(22) Filed: Mar. 29, 2005

(65) Prior Publication Data

US 2005/0188316 A1 Aug. 25, 2005

Related U.S. Application Data

(62) Division of application No. 10/100,339, filed on Mar. 18, 2002, now Pat. No. 7,113,169.

(51) Int. Cl.
*G06F 3/00* (2006.01)
*G06F 3/048* (2006.01)

(52) U.S. Cl. ............... 715/754; 345/157; 345/158; 715/741

(58) Field of Classification Search .............. 715/727, 715/728, 741, 856, 754; 345/157, 158
See application file for complete search history.

(56) References Cited

U.S. PATENT DOCUMENTS

| | | | | |
|---|---|---|---|---|
| 5,793,361 | A * | 8/1998 | Kahn et al. | 345/179 |
| 5,920,841 | A * | 7/1999 | Schottmuller et al. | 704/275 |
| 6,275,214 | B1 * | 8/2001 | Hansen | 345/158 |
| 6,681,205 | B1 * | 1/2004 | San Martin et al. | 704/243 |
| 6,895,558 | B1 * | 5/2005 | Loveland | 715/746 |
| 2001/0030668 | A1 * | 10/2001 | Erten et al. | 345/863 |
| 2003/0169233 | A1 * | 9/2003 | Hansen | 345/158 |

\* cited by examiner

*Primary Examiner*—Dennis Bonshock
(74) *Attorney, Agent, or Firm*—Joseph A. Mancini

(57) ABSTRACT

This invention provides a method for registering and enrolling multiple users in a interactive information display systems where the untethered multiple users interact with large information displays using laser pointers coordinated with voice commands. A registration program assigns a unique identification to each user that associates a particular user's voice and a particular laser pointer pattern chosen by that user, with that particular user. Users may speak voice commands. The system will then perform speech recognition of the user's voice command. If the command is recognized, the system performs the speech-recognized command as a window operation.

1 Claim, 9 Drawing Sheets

METHOD FOR LOCAL REGISTRATION, ENROLLMENT, AND INTERACTION WITH MULTIPLE-USER INFORMATION DISPLAY SYSTEMS BY COORDINATING VOICE AND OPTICAL INPUTS

CROSS-REFERENCE TO RELATED APPLICATIONS

The present application is a divisional application of and claims priority from related, co-depending, and commonly assigned U.S. patent application Ser. No. 10/100,339 filed on Mar. 18, 2002 now U.S. Pat. No.7,113,169 entitled "apparatus and Method for a Multiple-User Interface to Interactive Information Displays" also by Sakunthala Gnanamgari and Jacqueline Smith. Accordingly, U.S. patent application Ser. No. 10/100,339 is herein incorporated by reference.

STATEMENT OF GOVERNMENT INTEREST

The invention described herein may be manufactured and used by or for the Government for governmental purposes without the payment of any royalty thereon.

BACKGROUND OF THE INVENTION

This invention relates to the interactive control of large information displays and, specifically, to the remote interactive control of such information displays by multiple, simultaneous users.

The standard configuration of the desktop computer introduced in the 1970s consisted of a monitor for visual display, and a keyboard and mouse for inputs. Displays of computer desktops were traditionally controlled via the keyboard and mouse. The development of light pens and touch screens for direct interaction with the desktop monitor provided an alternate means of interaction with the desktop computer system. These tethered means of interaction for the human user constrained the number of people who could view the information to the single user and a small audience. The need to share the displayed information with a larger audience led to the use of large screen displays and video projection equipment with the desktop monitor.

The display of computer desktops onto a translucent screen via rear projection has become prevalent since the 1990s. The resulting magnified desktop display allows a larger audience to view information at meetings, lectures, and classroom settings. Manufacturers of video projector equipment have refined their high resolution projectors so as to offer resolutions of 1280 ×1024 pixels and to make them available at moderate cost.

Notwithstanding this development in technology, a human user interaction is still constrained to desktop based, tethered control of the application windows on the large, wall-based display. The earlier use of light pens to interact with the desktop monitor may have influenced the idea of using a laser pointer as an input device for activating window menus and elements and as an electronic grease pencil. The introduction of laser pointers as an alternative input device to the mouse and keyboard has allowed human users to interact in an untethered mode.

To detect and track a moving beam of laser light on a wall-based display area, wide-angle lens cameras positioned behind the translucent screen are used to capture a rapidly moving circular laser beam. This basic imaging capability motivated the idea to use a laser pointer as an input device to replace the traditional desktop keyboard and mouse, in conjunction with the replacement of the desktop monitor by the large projected display wall.

The first display areas were limited to the resolution and physical area of the screen. To achieve an increased display area, one needs to combine multiple displays together to create a larger contiguous display area that can be treated as a single screen for interaction. X-Windows (a UNIX based windows protocol) based software such as X-MetaX has allowed for the seamless horizontal tiling of multiple screens to form a single continuous display of the computer desktop. The X-Windows capability improved upon the display of separately horizontally tiled windows that were not contiguous. This represents the current state-of-the-art of the Air Force Research Laboratory (AFRL) Interactive DataWall.

The AFRL Interactive Data Wall art consists of single, one-at-a-time usage of a laser pointer as an input device with a video projection display screen. In essence, it uses a laser pointer as a substitute for a keyboard or mouse. An approach to tracking a single laser pointer has been disclosed in a U.S. patent application Ser. No. 09/453,258 entitled "Display Pointer Tracking Device" by Sweed. This approach is hardware based and is limited to the tracking of an unmodified laser pointer output, typically a circular focused spot as seen by the human eye when projected on a screen surface. Single laser pointer implementations foreclose the possibility of multiple persons interacting simultaneously with a large display, as it has only one laser spot that is tracked on the basis of laser beam intensity.

The use of the aforementioned Interactive DataWall is still limited to a single user, i.e. only one person at a time can manipulate the computer desktop as projected onto the screen. There is no way to allow more than one person to simultaneously access the display system using the Display Pointer Tracking Device in Sweed, which is based strictly on intensity detection. Large display systems are designed to project and display the computer desktop in a larger format than is possible on a standard computer monitor.

The AFRL Interactive Data Wall is limited to single user interaction with the display wall using that user's laser pointer and voice commands. The Interactive Data Wall uses a "Display Pointer Tracking Device" developed by Sweed (U.S. patent application Ser. No. 09/453,258), which is hardware based and tracks the laser pointer output on the basis of laser beam intensity.

There exists a patent for a teaching installation for learning and practicing the use of fire-fighting equipment (Deshoux/ U.S. Pat. No. 6,129,552). This invention involves a large display screen that shows varying fire sequences controlled by a computer. The user interacts with the display by using four fire extinguishers fitted with laser pointers. The optical sensors identify the point on the display where the laser image is focused. The computer can determine which of the four lasers is being used; however, it is not specified that multiple users can operate the invention simultaneously.

There exists a patent for a method and display control system for accentuating (Nguyen/U.S. Pat. No. 5,682,181). In this invention, the user can draw on a display by using a hand-held light wand. This light is picked up by a CCD camera aimed at the display. The accentuation drawn by the user can be displayed in different colors. It appears that this invention is intended for use by a single user and not multiple simultaneous users. In the computer input system and method of using the same (Hauck/U.S. Pat. No. 5,515,079), the input light source is that of a hand-held lamp. Aside from that, it is very similar to Nguyen's patent.

A similar invention, an information presentation apparatus, and information display apparatus (Arita/U.S. Pat. No. 5,835,078), allows multiple users to interact with a display using multiple laser pointers. The inventers claim that the pointers could be distinguished from each other by using laser pointers with varying wavelengths or even varying shapes. However, this particular patent does not incorporate the integration of voice commands with the users' laser pointers.

The unconstrained pointing interface for natural human interaction with a display-based computer system (Kahn/U.S. Pat. No. 5,793,361) may also facilitate multiple users (without voice commands). In this case, the laser pointer image detector is located within the laser pointer.

There also exists a method and apparatus for detecting the location of a light source (Barrus/U.S. Pat. No. 5,914,783). In this invention, the user can draw on a display by using a laser pointer. This light is not picked up by a CCD camera like the other patents. Instead, pixel mirrors are sequentially switched to reflect light from a corresponding on-screen pixel to a detector in an order which permits identifying the on-screen pixel illuminated by the spot of laser light. It appears that this invention is intended for use by a single user and not multiple simultaneous users. The multi-scan type display system with pointer function (Ogino/U.S. Pat. No. 5,517,210) is similar to Barrus/U.S. Pat No. 5,914,783 in that it facilitates use of one laser pointer. The pointer position is handled mainly with circuitry as opposed to image processing software.

In view of the above, it would therefore be desirable to have an apparatus which expands the single user capability of the AFRL Interactive Data Wall to at least four independent users with those users being distinguished by their selected laser patterns. It would be further desirable to enable multiple users to work collectively by their simultaneous access of an information display in collaborative and team applications where such simultaneous access is provided by each user's respective laser pointer patterns and voice commands.

Applications for such an apparatus would include education, corporate and professional training environments, and planning and decision making applications where multiple users interact with a large amount of data. Other markets would include financial trading, budget preparation and analysis for organizations, product planning and marketing decisions. Advanced versions of such an apparatus could provide a solution for large network management for telecommunications, electric power, and corporate networking areas. These applications involve the use of geographic, educational curriculum, and information presentation displays, supplemented by supporting information and images, with multiple users trying to interact with display medium. Managing this myriad of information types and formats is unwieldy today, and leads to solutions which are at best, compromises.

OBJECTS AND SUMMARY OF THE INVENTION

Therefore, one object of the present invention is to provide a method for interactive control of large information display systems.

Yet another object of the present invention is to provide a method for interactive control of large display systems that utilizes an user's voice commands, laser pointer, or traditional keyboard and mouse command inputs.

Still another object of the present invention is to provide a method for simultaneous collaboration by multiple users employing means and methods for identifying specific users' voices, laser pointer inputs, keyboard entries and mouse manipulations so as to distinguish any such input commands among respective users.

Briefly stated, this invention relates to the untethered multiple user interaction of large information displays using laser pointers coordinated with voice commands. A projection system projects application windows onto a large information display. One or more users may command their respective window applications using laser pointers and/or voice commands. A registration program assigns a unique identification to each user that associates a particular user's voice and a particular laser pointer pattern chosen by that user, with that particular user. Cameras scan the information display and process the composite of the application windows and any laser pointer images thereon. A sequence of computer decisions checks each laser pointer command so as to correctly associate respective users with their commands and application windows. Users may speak voice commands. The system will then perform speech recognition of the user's voice command. If the command is recognized, the system performs the speech-recognized command as a window operation.

According to an embodiment of the invention, method for registering and enrolling multiple users in an interactive information display system, comprises the steps of registering at least one user, which further comprises first determining whether the user is enrolled, if the user is enrolled, then the user performs voice logon, voice verification, selects a unique light pattern to project onto an information display, projects said unique light pattern onto said information display, but if the user is not enrolled, the user performs enrollment and it is determined whether the user's command is from the unique light patterns or from the user's voice, if user's command is from the unique light pattern, then the image of said unique light pattern is detected, the detected image is digitized, the pattern of the digitized detected image is identified and it is determined whether the identified pattern matches known templates, the identified pattern matches known templates, then template number is output, the template number and the identified pattern's location is broadcast to all client computers, the template number and the user's identification are associated, an operation on the user's application window is performed and it is again determined whether the user's command is from the unique light patterns or from the user's voice, but if the identified pattern does not match known templates, it is again determining whether the user's command is from the unique light patterns or from the user's voice, and if the user's command is not from the unique light pattern, then it is determined whether user's voice command is recognized and if the user's voice command is recognized an operation on user's application window is performed and it is again determined whether user's command is from the unique light patterns or from the user's voice but if the user's voice command is not recognized then it is again determined whether the user's command is from the unique light patterns or from the user's voice.

The above and other objects, features and advantages of the present invention will be apparent from the following description read in conjunction with the accompanying figures, in which like reference numerals designate the same elements.

DETAILED DESCRIPTION OF THE EXEMPLARY EMBODIMENT

Figure 1:
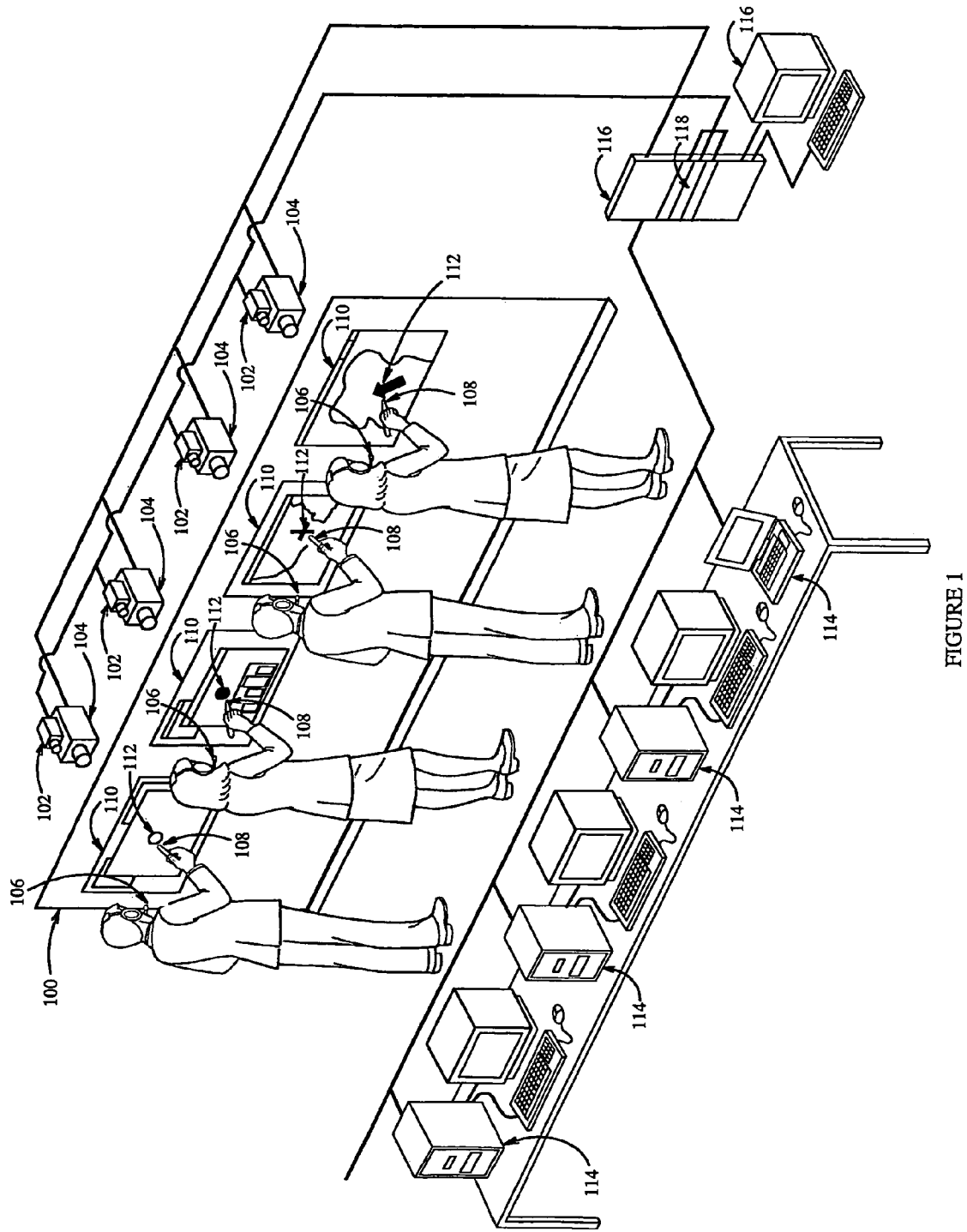
FIG. 1 shows the elements of the present invention and depicts user interaction therewith.

Referring to FIG. 1, users stand in front of an information display 100 and each of them hold a laser pointer 108 (light pen, pointer, etc.) and wear a wireless headset/microphone 106. Laser pointers 108 all have a specific projected image 112 associated with them, these projected images include but are not limited to a hollow circle, a solid circle, a cross, and an arrow shape. Users logs into (208, see FIG. 2) the system vocally using voice verification. When the voice is verified, users must then select one of the previously mentioned projected images 112. Once logged into the system, users have access to a specific client computer 114 whose operating system is displayed in window 110 on the information display 100. Users have access to their respective window 110 and can control the applications within that window by means of their untethered laser pointers 108 and voice commands. Laser pointers 108 may operate as a pointer to perform window operations, much like a mouse would, or they can be used to draw on the information display 100.

In this particular embodiment, four projectors 104 project images onto the information display 100. While projectors 104 may be on either side of the display wall 100, in the preferred embodiment, projectors 104 are on the side of the information display 100 opposite the users. Projectors 104 project a collective image that is being generated by display controller 116. Display controller 116 provides network access between users and their respective client machines 114 and displays the desktop environments of all client machines onto information display 100.

Cameras 102 receive the image that is displayed on information display 100 by a combination of computer-projected and user-generated, laser pointer projected images 112. While cameras 102 may be on either side of information display 100, in the preferred embodiment, the cameras 102 are on the side of information display 100 opposite the users. Frame grabbers 118 digitize the image that is received by cameras 102. Display controller 116 performs image processing and analysis of sequential images retained and transmitted by frame grabbers 118.

Based on the detection of laser pointer 108 projected image 112, by cameras 102, the position of laser pointer 108 projected image 112 is obtained. Its coordinates relative to information display 100 are converted into mouse coordinates and used to simulate mouse movements. Display controller 116 performs image detection of unknown projected image 112 pattern and uses image processing software (such as commercial off-the-shelf software named HALCON) for pattern identification so as to match projected image 112 pattern to a known template. Image processing software outputs the corresponding template number if the cameras 102 detect any features that match any of the known projected image 112 patterns along with the spatial coordinate (i.e., x,y) locations of the projected image 112 pattern detected. The location and shape are then sent to all client computers 114 for interpretation and execution of the user's application window 110 activities.

The user's application window 110s receives the projected image 112 shape and location information from display controller 116. If the shape information matches the shape assigned to that user's current laser pointer 108 projected image 112, then the user's specified action is executed based on the laser pointer's 108 mode (pointing or drawing). Based on the detected location of laser pointer projected image 112, the display controller 116 modifies the image that is transmitted to the projector 104. If the projected image 112 is not the one chosen by the user, then the command is ignored.

Each user may also interact with his applications by using voice commands through his wireless headset-/microphone 106. In some applications, laser pointer 108 projected images 112 are combined with he voice commands to issue commands that require some action based on location information. One such example is: "Draw a circle here." Another example is: "Draw line from here to there."

These voice commands use words like "here" and "there" to describe locations. These locations are supplied by the display processor 116 when it detects user's laser pointer 108 projected image 112.

Figure 2:
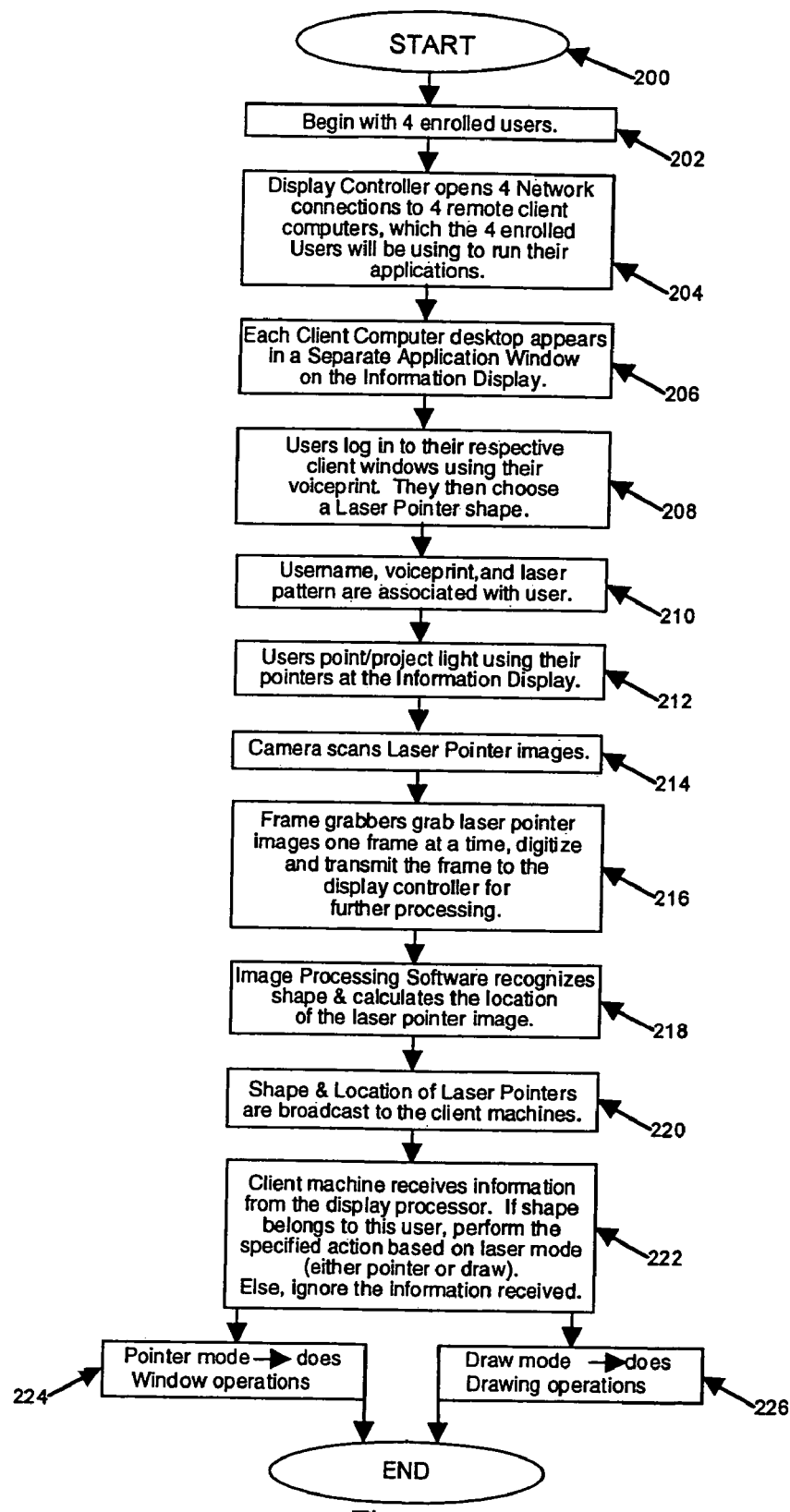
FIG. 2 shows a flowchart of the processing performed in the present invention.

Referring to FIG. 2, all client computers (see 114, FIG. 1) are connected 200 through a Local Area Network (LAN). Client computers (see 114, FIG. 1) run Virtual Network Computing, a commercially available software package that enables a computer's desktop to be viewed and controlled from a separate computer (hereafter referred to as VNC). Client computers (see 114, FIG. 1) run VNC Server. The information display (see 116, FIG. 1) utilizes the VNC Viewer.

Four (4) users are enrolled 202. Each user must cooperatively enroll (if they have not previously enrolled) by speaking specific utterances to create a speech model of that user's vocal characteristics. Voice verification identifies an individual user by his biometric voice pattern. The relationship between a user, the username, password, and their specific voice pattern is known to the system upon completion of the enrollment process. When a user wants to register using voice verification (assuming that the user is already enrolled), the user will utilize the wireless microphone/headset or handheld microphone (see 114, FIG. 1) to repeat the specific utterances and allow the present invention to compare what was spoken in real-time and what was previously stored to identify that particular user. The user will be prompted with a window showing the specific utterances that must be spoken to complete voice verification.

Four (4) new VNC Viewer connections to the four (4) remote client computers are opened 204, which contain all of the applications to be displayed on the information display (see 100, FIG. 1). Computer desktop environments of the client computers (see 114, FIG. 1) are displayed 206 on the information display (see 100, FIG. 1).

Users log in to their respective client computers (see 114, FIG. 1) using voice verification and then select 208 a laser pointer (see 108, FIG. 1) projected image (see 112, FIG. 1) for that interactive session. Each user has previously been assigned a unique username and system password to allow them to logon to the present invention. Each user is recognized by their unique username and system password within the commercial operating system of the computer they are utilizing. A login window enables the entire registration process comprised of user logon, user voice verification, and user selection of a specific laser pointer (see 108, FIG. 1) projected image (see 112, FIG. 1) on the client computer (see 114, FIG. 1) desktop window (see 110, FIG. 1) displayed on the information display (see 100, FIG. 1). The laser pointer (see 108, FIG. 1) projected images (see 112, FIG. 1) are currently a line circle, solid circle, cross, and a line square. However additional, commercially available, patterns can be fabricated. The user is required to point the laser pointer (see 108, FIG. 1) projected image (see 112, FIG. 1) at the information display (see 100, FIG. 1) whereupon the cameras (see 102, FIG. 1) continuously scan the information display (see 100, FIG. 1).

Several parameters must be associated 210 with any one user to facilitate that user's control of and access to each respective application window (see 110, FIG. 1). Identification through associating 210 a user's voice verification, speech recognition, and tracking of each user's laser pointer (see 108, FIG. 1) projected image (see 112, FIG. 1) allows for orderly interaction by each user with the information display (see 100, FIG. 1).

Users point/project 212 laser pointer (see 108, FIG. 1) projected images (see 112, FIG. 1) onto the information display (see 100, FIG. 1). The projected images (see 112, FIG. 1) on the information display (see 100, FIG. 1) are continuously scanned 214 by cameras (see 102, FIG. 1) behind the information display (see 100, FIG. 1). Frame grabbers (see 118, FIG. 1) grab 216 the projected image (see 112, FIG. 1) one frame at a time, digitize them, and send the digitized image to the display controller (see 116, FIG. 1) for detection of the unknown projected image (see 112, FIG. 1) and image pattern identification using HALCON.

HALCON image processing software matches 218 the projected image (see 112, FIG. 1) to a known template. HALCON outputs the corresponding template number if cameras (see 102, FIG. 1) detect any features that match any of the known light patterns along with the spatial coordinate (x,y) location of the light pattern detected. The shape and location are then broadcast 220 to client computers (see 114, FIG. 1) through the LAN.

Client computers (see 114, FIG. 1) receive the shape and location information from the display processor (see 116, FIG. 1). If the shape information matches the shape of the projected image (see 112, FIG. 1) assigned to that client computer's (see 114, FIG. 1) current user, the specified action is executed based on the laser's mode 222. If the shape of the projected image (see 112, FIG. 1) is not the one specified for the user, then the received information is ignored 222.

The two modes of interacting with an application window (see 110, FIG. 1) using a laser pointer (see 108, FIG. 1) are by entering a pointer mode 224 or by entering a drawing mode 226. Pointer mode 224 consists of using the laser pointer (see 108, FIG. 1) as a replacement for a conventional mouse with its left and right button clicking and positional pointing. Drawing mode 226 consists of using the laser pointer (see 108, FIG. 1) in such a manner as to draw and annotate on the information display (see 100, FIG. 1).

Functionality of Display Controller

Figure 3:
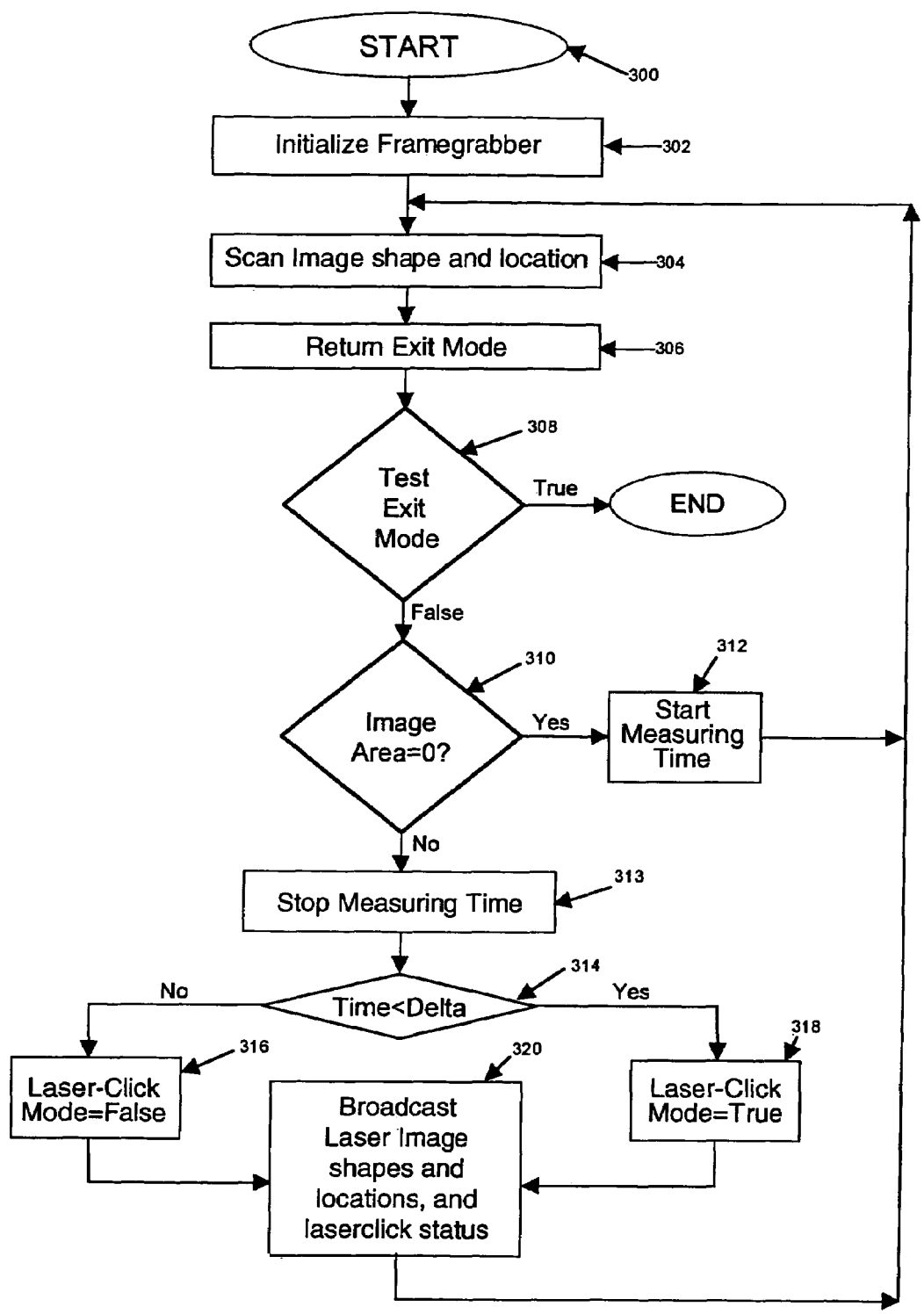
FIG. 3 shows a flowchart of the processing performed in the present invention.

Referring to FIG. 3, initialization of frame grabbers 302 (see 118, FIG. 1) starts 300 the inputting of the image on the information display (see 100, FIG. 1). For example, an "Open FrameGrabber" step is performed in order to initialize the frame grabber. Also, a "SetExitMode" variable that indicates that operation of the program is to be terminated, is set.

The laser pointer (see 108, FIG. 1) projected image (see 112, FIG. 1) is then scanned 304. This is accomplished as follows. First, a "GrabImage" function is implemented, where a single frame is grabbed and converted into a bitmap format. Grabbing a frame and converting the frame into a bitmap format is accomplished in a manner which is readily understood by one of ordinary skill in the art. The frame can be grabbed using cameras (see 102, FIG. 1) which, again is readily understood by one of ordinary skill in the art. The resolution can be varied as desired by the user. In the exemplary embodiment of the present invention, the resolution is 640×480 (which may be different than the resolution of the projected image).

A threshold function is then performed. The threshold function is performed in accordance with known image processing techniques. Thus, the bitmap format image can be reduced to a gray scale having, for example, 256 different shades. The threshold function is given a minimum grayscale value. These values can be programmer-defined variables that depend upon programmer requirements. Thus, the light that results from the laser hitting the screen will fall between the minimum gray scale value and the maximum gray scale value of the bitmap image which is given to the threshold function. Concurrently, the remainder of the image will be below the minimum gray scale value given to the threshold function. Again, the threshold function operates as a filter and will convert the laser image (which again falls between the minimum and maximum gray scale values) to a completely white (for example) area while the remainder of the image can be black (for example). The "GetArea" function may return, for example, the number of pixels that occupy the area that was previously image processed to be white. A "GetCoordinates" function returns (x,y) coordinates that correspond to the image processed white area. As the white area extends over a number of coordinates, the exact (x,y) coordinates within that area to be returned can be determined based upon user preference. The center of gravity of the image processed white area, for example, may be used. A "GetShape" function is also used to distinguish the shape of the laser pointer image pattern. The "PatternMatching" function compares the acquired shape of the laser pointer (see 108, FIG. 1) projected image (see 112, FIG. 1) and matches the shape to a known template. The corresponding template number is output if the cameras (see 102, FIG. 1) detect any features that match any of the known light patterns.

The "Exit Mode" variable is next obtained 306. "Exit Mode" variable is evaluated 308 to determine whether program functions should be terminated. If when "ExitMode" variable is evaluated and if "True" then program function is terminated. Otherwise, if "Exit Mode" variable is "False", then processing proceeds to an evaluation of image areas 310.

Image area is evaluated 310 to determine whether or not it is equal to zero. The image area was previously determined from the "GetArea" function. If the image area is evaluated to be equal to zero 310, then processing proceeds to measuring the amount of time 312 between two "clicks" (i.e. illuminations) of the laser pointer (see 108, FIG. 1). Here, the operation of "Letting Go" of the laser pointer (see 108, FIG. 1) (where the laser transitions from an on state to an off state) begins to measure the time 312 until subsequent illumination by the laser pointer (see 108, FIG. 1). Processing then returns to scanning the laser pointer (see 108, FIG. 1) projected image (see 112, FIG. 1) 304.

A determination is made 310 as to the image-processed area of the projected image (see 112, FIG. 1) projected by the laser pointer (see 108, FIG. 1). When the laser pointer (see 108, FIG. 1) is off, the image-processed area of the projected image (see 112, FIG. 1) is zero. When the laser is on, the image-processed area of the projected image (see 112, FIG. 1) is greater than zero. The entire process above from scanning the laser pointer (see 108, FIG. 1) projected image (see 112, FIG. 1) 304 through measurement of the time 312 are repeated until the image area is greater than zero. Once the image area is evaluated 310 to be greater than zero, time measurement 312, is terminated 313. In other words, when time measurement is terminated 313, the total amount of time between subsequent "clicks" (i.e. turning the laser pointer (see 108, FIG. 1) on and off analogously to a mouse click) of the laser pen is determined.

The previous time measurement 312 is next evaluated 314 to determine whether or not it is less than a predetermined value, "Delta". If the previous time measurement 312 is determined to be less than a predetermined value "Delta", it is then determined that a "LaserClick" has taken place 318. If the previous time measurement 312 is determined to be greater than a predetermined value "Delta", it is determined that a "LaserClick" has not taken place.

The laser pointer (see 108, FIG. 1) projected image (see 112, FIG. 1) shape, the spatial coordinate (x,y) location of the shape detected, and the "LaserClick" status (True or False) are then broadcast 320 to client computers (see 114, FIG. 1) through the LAN. The entire process above beginning with scanning the laser pointer (see 108, FIG. 1) projected image (see 112, FIG. 1) 304, is repeated.

Functionality of Client Computers

Figure 4:
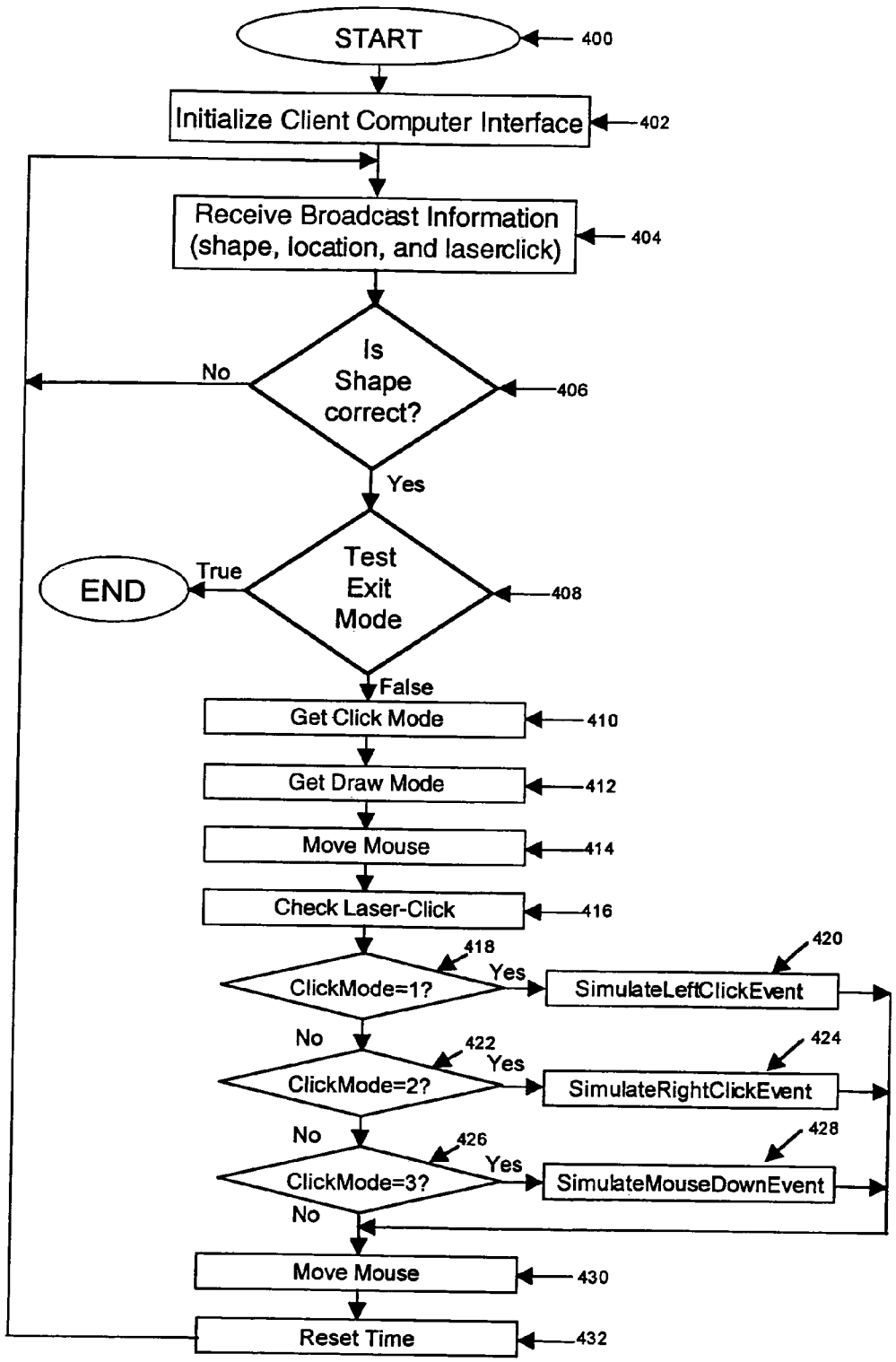
FIG. 4 shows a flowchart of the processing performed in the present invention.

Referring to FIG. 4, there are four (4) client computers (see 114, FIG. 1). Each of the four (4) client computers (see 114, FIG. 1) is initialized. 402 A "LoadForm" Operation may be performed. In this operation, the user interface (i.e. mouse control interface) is displayed. A "SetClickMode" may also be performed. In this operation, the "SetClickMode" indicates how operation of the laser pointer (see 108, FIG. 1) is to be interpreted. Thus the laser pointer (see 108, FIG. 1) to some extent emulates operation of a mouse. As is known to one skilled in the art, a mouse can operate in a number of different ways. By performing a left click on the mouse, certain operations are performed. By performing a right click on the mouse, other operations are performed. Holding the left mouse button down may perform yet a further set of operations. Operation of the laser pointer (see 108, FIG. 1) is desirably defined so that it corresponds to one of these modes. The user can indicate which one of these modes the laser pointer (see 108, FIG. 1) is to emulate. Operation of the laser pointer (see 108, FIG. 1) can be changed from one mode to another mode. Also, a "SetExitMode" may be established. This can be a variable which, when set to a predetermined condition, indicates that operation of the program is to be terminated.

Client computer (see 114, FIG. 1) receives broadcast information 404 from display controller (see 116, FIG. 1). The broadcast contains the shape and location information of the laser pointer (see 108, FIG. 1) projected image (see 112, FIG. 1) along with the "LaserClick" status. The shape information is compared 406 to the projected image (see 112, FIG. 1) shape assigned to the user of this particular client computer (see 114, FIG. 1). If the shape information matches the shape assigned to that user's current laser pointer (see 108, FIG. 1) projected image (see 112, FIG. 1), then the specified action is executed based on the laser pointer's (see 108, FIG. 1) mode (either pointing or drawing). If the shape is not the one specified for the user, then the command is ignored and the client computer (see 114, FIG. 1) waits for the next broadcast 404.

The "Exit Mode" variable is evaluated 408 to determine whether program functions should be terminated. If the "Exit Mode" variable is evaluated 408 as "True", program function is terminated. Otherwise, if the "Exit Mode" variable is evaluated 408 as "False", processing proceeds.

The current value of the "GetClickMode" variable is next determined 410. The current value of the "DrawMode" is determined 412. A cursor is moved on the screen 414 (which corresponds to mouse movement) in accordance with the information obtained in the previous steps. Another check is performed 416 to detect the presence of a "LaserClick".

The process of generating mouse events is described next. A "mouse event" causes the laser pointer (see 108, FIG. 1) to emulate the operation of a mouse. The value of the "ClickMode" is checked to determine whether it is a "1" 418, "2" 422, or "3" 426. The values "1", "2", or "3" may represent, for example, "LeftClickMode" (clicking a mouse's left button), "RightClickMode" (clicking a mouse's right button), and "LeftDownMode" (holding down a mouse's left button), respectively. Operations are performed 420, 424, 428 by the operating system based on these respective mouse clicks.

If, for example, "ClickMode" does not correspond to values "1", "2", or "3", then the "MoveMouse" function is performed 430. The "MoveMouse" function includes a "SetCursorPosition" function. The "SetCursorPosition" function relies upon the (x,y) coordinates of the laser pointer (see 108, FIG. 1), which were obtained from the broadcast 404 information a few steps earlier. Thus, the "SetCursorPosition" now has (x,y) coordinates, which correspond, to the position of the laser pointer (see 108, FIG. 1) projected image (see 112, FIG. 1) on the information display (see 100, FIG. 1). The cursor being displayed on the information display (see 100, FIG. 1) is then moved to the position that corresponds to the (x,y) coordinates which were given to that function. In other words, the cursor is moved (i.e. to the location corresponding to the center of gravity of the laser pointer (see 108, FIG. 1) projected image (see 112, FIG. 1) hitting the information display (see 100, FIG. 1).

Once the "MoveMouse" function has been completed 430, the "ResetTime" function is performed 432. In the "ResetTime" function, the predetermined value "Delta" and a predetermined "Maximum" value are summed to generate a time value:

Time=Maximum+Delta

This sets "Time" to a value greater than delta to avoid the unwanted click events. Once the "ResetTime" function is performed 432, the process again waits for another broadcast 404. If "ClickMode" equals 3 426, then "SimulateMouseDownEvent" 428 will be performed.

Figure 5:
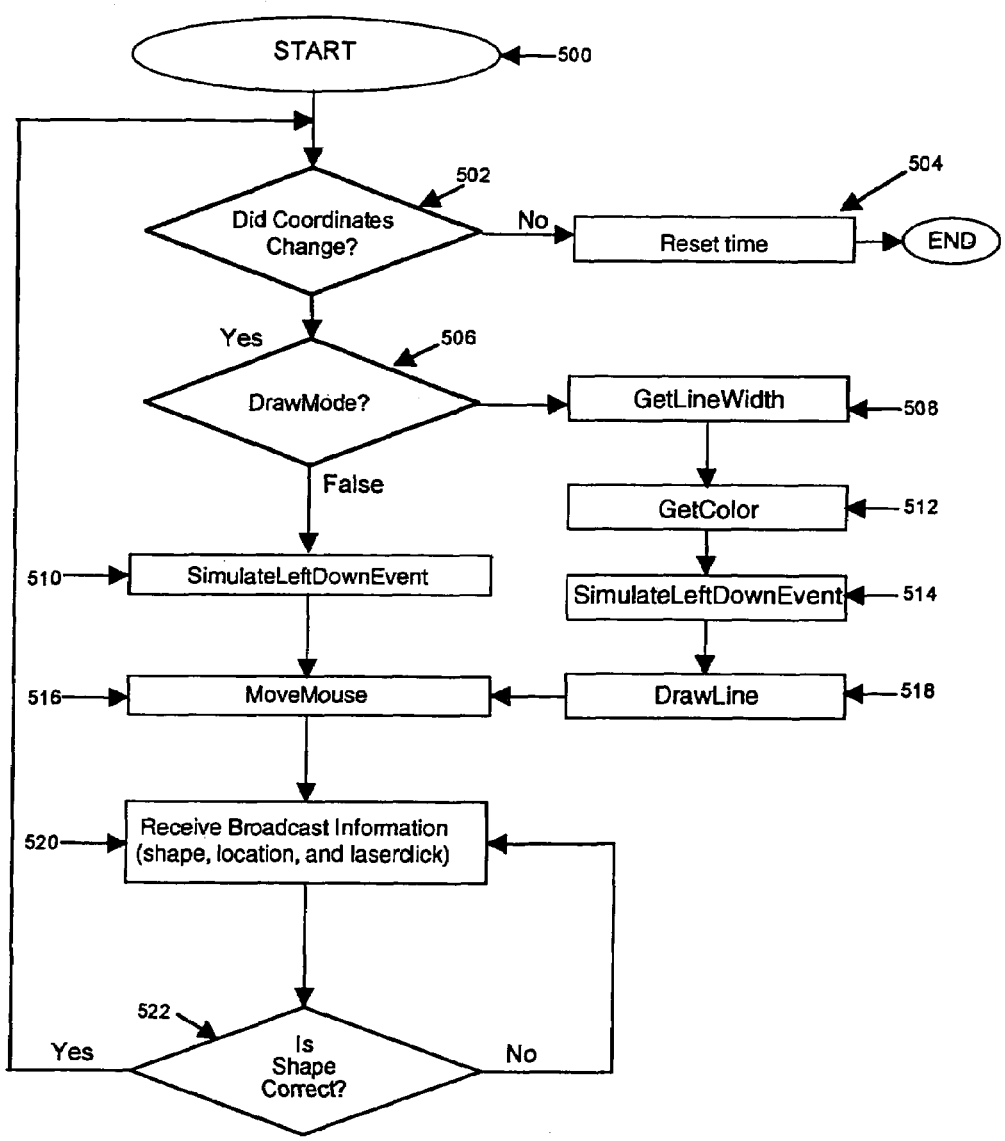
FIG. 5 shows a flowchart of the processing performed in the present invention.

Referring to FIG. 5, the (x,y) coordinates from the broadcast information are checked and a determination is made to see whether or not the laser pointer (see 108, FIG. 1) projected image (see 112, FIG. 1) has moved as would be indicated by a change in coordinates 502. If it has not moved, then the "ResetTime" function (see 504, FIG. 5) is performed as explained above so that the "Time" value is set to a "Maximum" value plus "Delta". Processing then returns to performing the "MoveMouse" function (see 430, FIG. 4).

If it is determined that the coordinates did change 502, then a determination is made as to whether the program is in the drawing mode 506. If the program is in the drawing mode, the line width 508 and the color 512 will be set based on where the user "clicked" with his laser pointer (see 108, FIG. 1) on the information display (see 100, FIG. 1). Thus, a determination is required as to the location where the user clicked. This information is used to determine the desired line width and color that the user wishes to use. A "SimulateLeftDownEvent" is then performed 514. The "SimulateLeftDown- Event" is similar to other operating system-type functions that were implemented such as, "SimulateLeftClickEvent" and "SimulateRightClickEvent". Finally, a "DrawLine" function is initiated 518 and point-to-point line drawing may then be accomplished. Thus, a variety of coordinates at which the laser pen has been pointing to are identified and lines may then be drawn to appear between those points.

If the program is not determined to be in the drawing mode 506, then a "SimulateLeftDownEvent" (which is explained above) is performed 510.

Processing then proceeds to performing a "MoveMouse" function 516. A "MoveMouse" function is performed 516 where the mouse cursor is moved to the laser pointer (see 108, FIG. 1) coordinates. Next, the current broadcast information from the display processor (see 116, FIG. 1) is received 520. Lastly, the recently received laser pointer (see 108, FIG. 1) projected image (see 112, FIG. 1) shape is checked 522 to determine whether or not it is the assigned shape for this user. If the shape is not correct, ignore the received information and wait for the next broadcast. If it is the correct shape, processing returns to determining whether the coordinates did change 502.

Functionality of Enrollment and Verification

Figure 6:
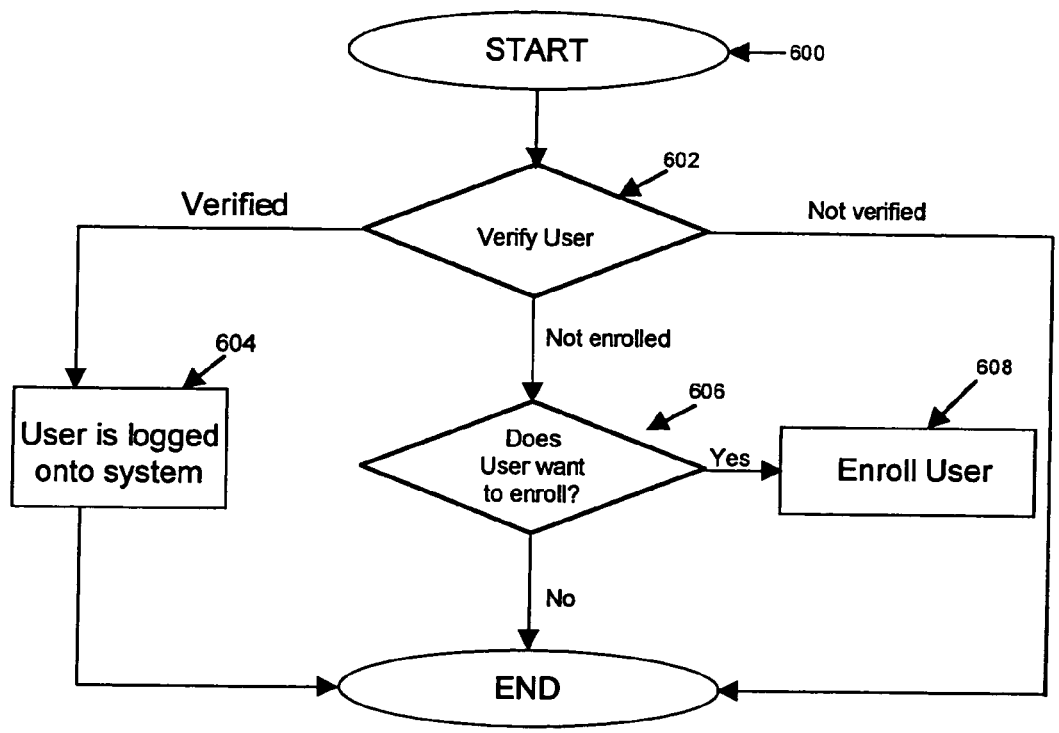
FIG. 6 shows a flowchart of the processing performed in the present invention.
Figure 7:
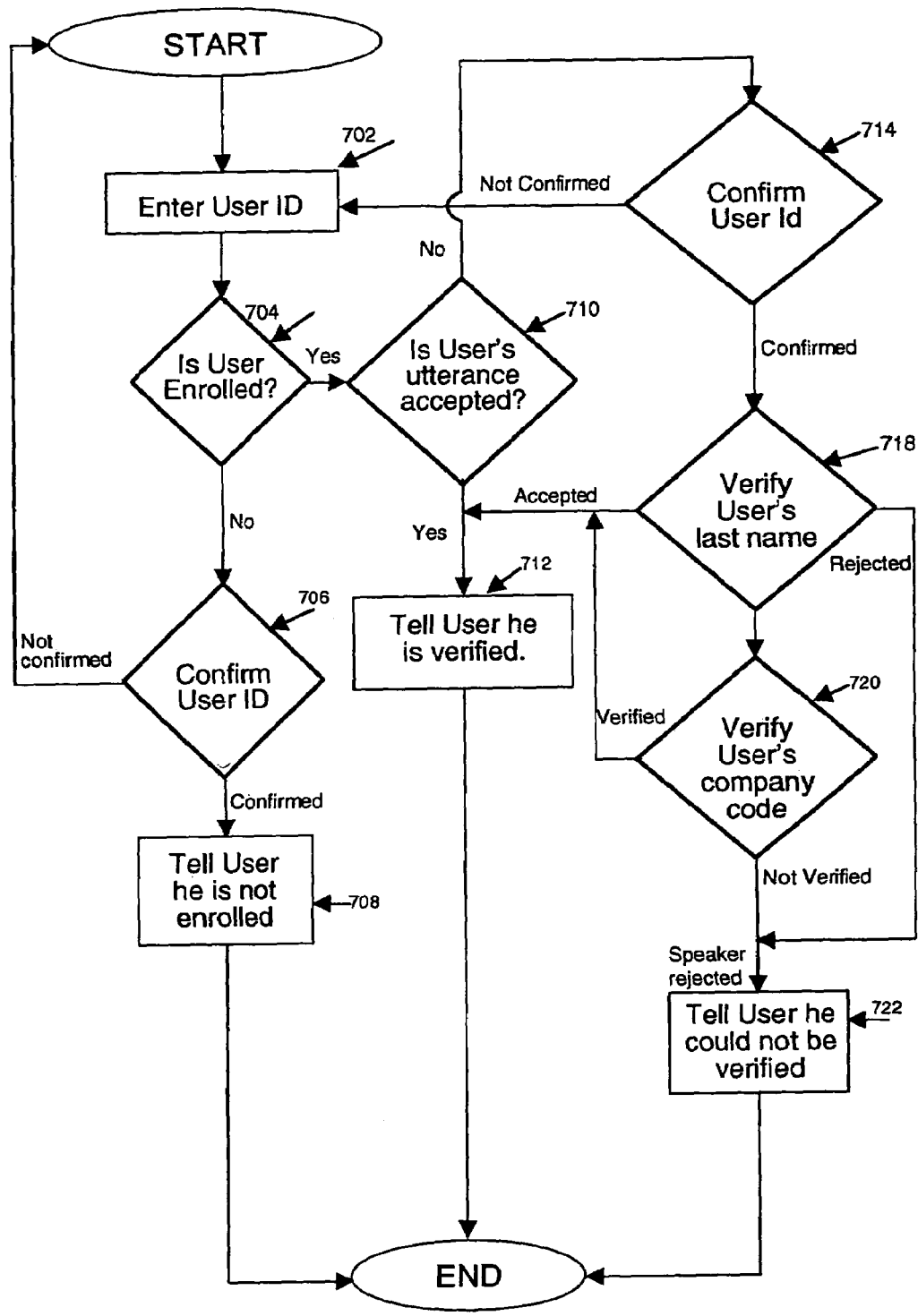
FIG. 7 shows a flowchart of the processing performed in the present invention.

Referring to FIG. 6 and FIG. 7 concurrently, a "Login" process begins with verification of the user 602. FIG. 7 is a detailed breakout of verification of the user.

Referring now to FIG. 7, the user identifies himself to the system by vocally entering his user ID 702 (an alphanumeric string). The commercially available verification software (hereafter called NUANCE) checks if user ID is valid by determining if that user is enrolled 704. If the user is enrolled, as evidenced by a valid ID, then the NUANCE software checks the user's utterance for acceptance 710 and if the utterance matches the previously existing voice print of the user, the user is told that their identity is verified 712. Processing returns to logging the user onto the system 604. Should, for any reason, NUANCE not accept the user's utterance 710, the software will attempt to gain more information. First, it will confirm the user's ID 714 to make certain that the user entered the correct account name. If the user says that the computer heard the wrong account name, the user enters his ID again 702. If the user says that the account name is correct, the user last name is verified 718. If the last name is accepted and verified 718, the user is told that his identity is verified 712. Processing then returns to logging on the user 604. If the user's last name is rejected 718, the user is told that he could not be verified 722. If the system is uncertain about the user's last name, the user is asked for his company code at which point it is checked for verification 720. If the company code is verified 720, the user is told that his identity is verified 712. Processing returns to logging on the user 604. If the company code is rejected 720, the user is told that he could not be verified 722. Processing then terminates and the user is not logged on.

If it is determined that a user is not enrolled 704, an attempt to confirm the user's ID is made 706. The system recites the account name that it heard. The user must respond to the system by saying that the account name is correct or that it is incorrect. If the user says that the account name is incorrect, the user enters his ID again 702. If the user says that the account number is correct, the user is told that he is not enrolled 708. Processing returns to asking the user if he wishes to enroll in the system 606. If the user says no, the program terminates. If the user says that he would like to enroll in the system, enrollment is initiated 608.

Figure 8:
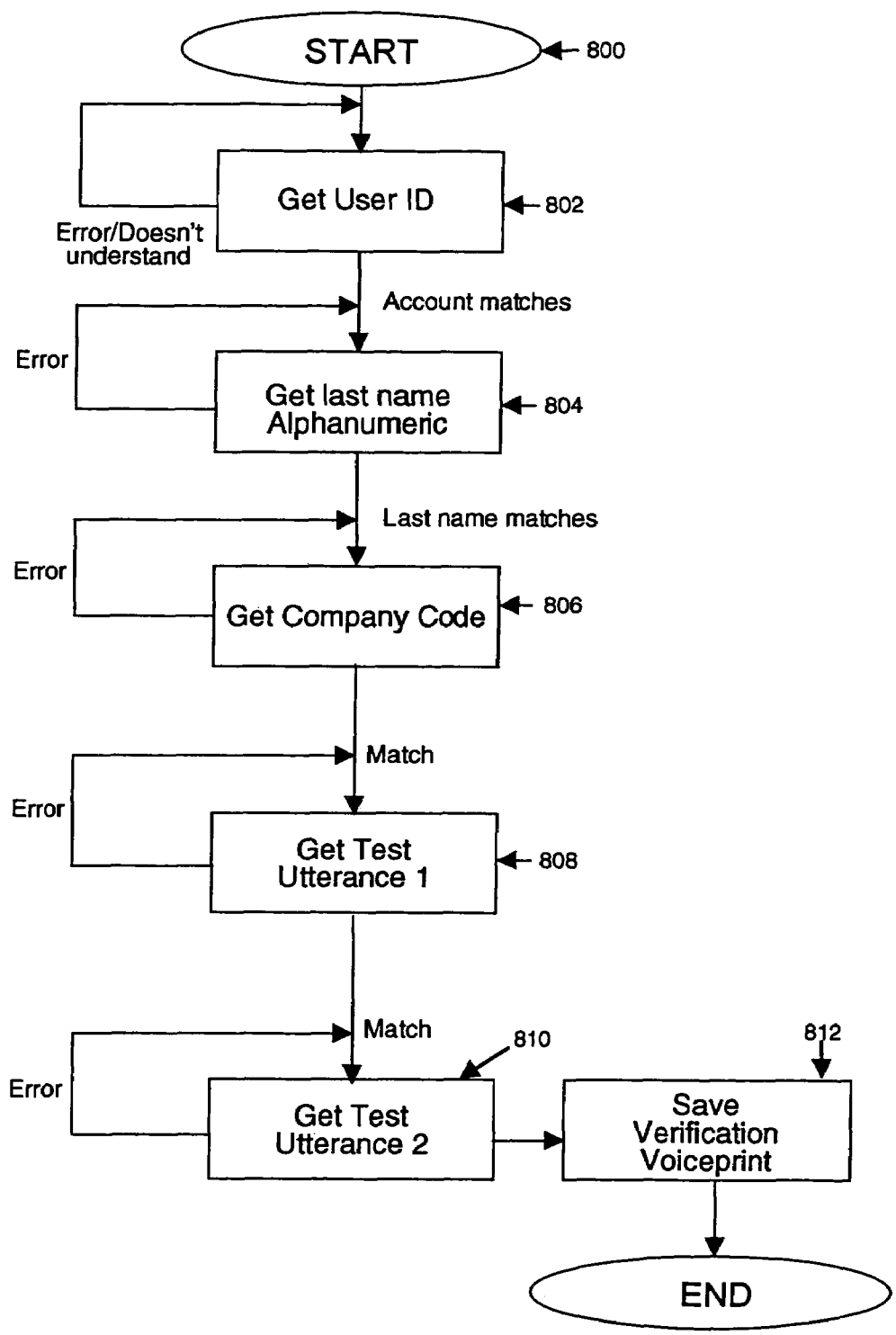
FIG. 8 shows a flowchart of the processing performed in the present invention.

Referring to FIG. 8, the enrollment process allows the user to generate an account by creating his or her voice profile. This voice profile will be used in the verification process to identify the user.

All of the following information is entered vocally by the user during enrollment. The process begins 800 when the user is prompted for his user ID (an alphanumerical string) 802. The enrollment process then prompts the user to enter his last name 804. The user is then asked for his company code 806. The enrollment software acquires a first test utterance 808, which records the users voiceprint by requiring the user to count from one to seven ("1,2 . . . 7"). A second test utterance 810 is also acquired; this time, the letters A through G are spoken ("A,B . . . G"). These steps being completed, the enrollment software saves the user's new account and voiceprint 812.

Alternate Explanation of the Exemplary Embodiment

Figure 9:
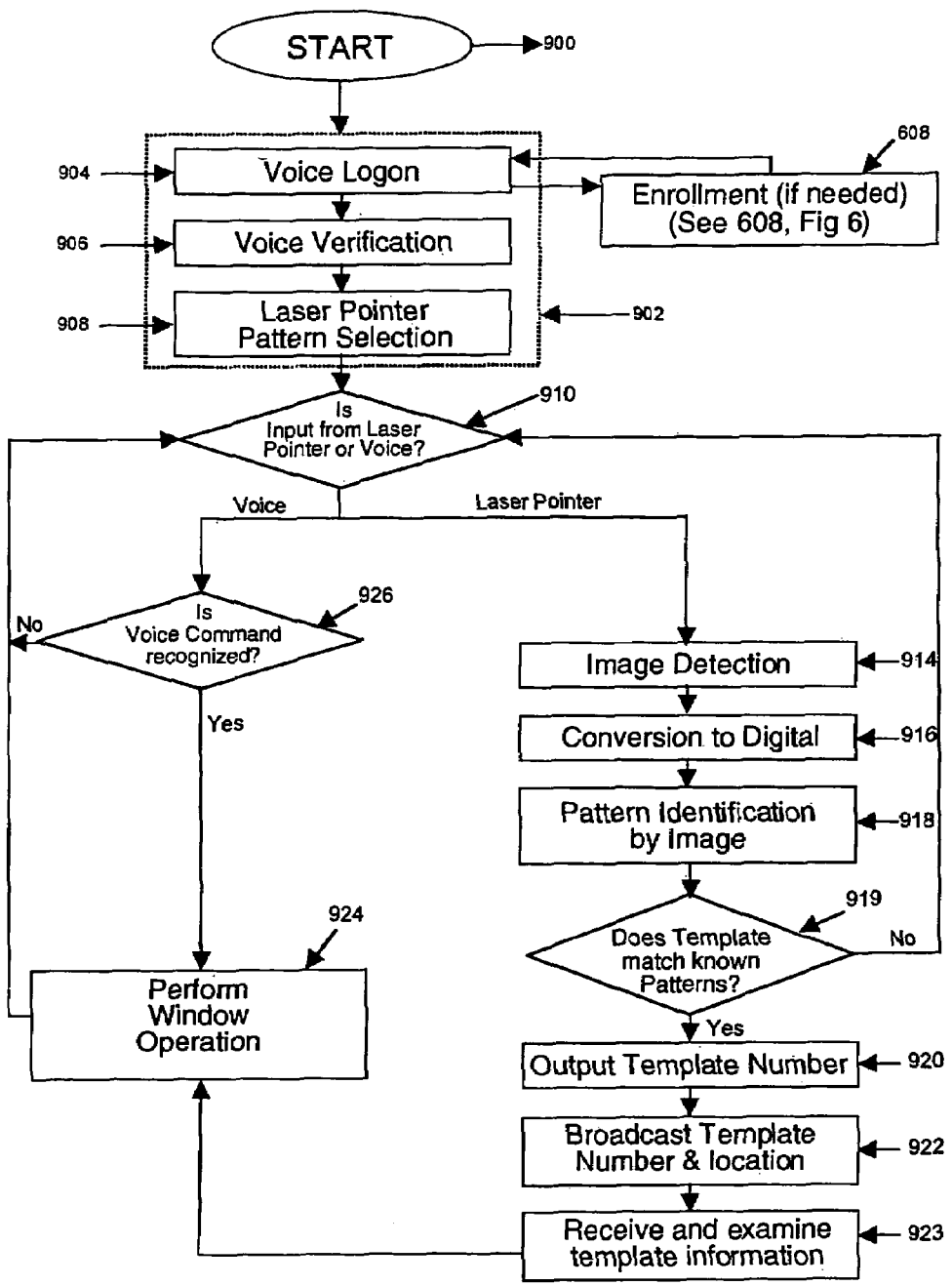
FIG. 9 shows a flowchart of the processing performed in the present invention.

Referring to FIG. 9, registration 902 comprises user voice logon 904, user voice verification 906, and user selection 908 of a laser pointer (see 108, FIG. 1) projected image (see 112, FIG. 1) shape for that interactive session. User voice logon 904 is the first of three stages of user registration 902 used in the present invention. Each user has previously been assigned a unique user ID to allow them to logon to the present invention. This user ID is created in an enrollment program (see 608, FIG. 6). The user ID is combined with the user's voiceprint to verify the identity of the user to grant the user access to the system. If the user ID does not exist in the system, the user will be asked to enroll (see 608, FIG. 6) in the system.

Each user must cooperatively enroll (see 608, FIG. 6) in the system (if they have never done so before) by speaking specific utterances to create a speech model/biometric/voiceprint of the user's vocal characteristics. Voice verification 906 identifies an individual user by the biometric voiceprint. The relationship between a user, the user ID, password, and their specific voiceprint is known to the system upon completion of enrollment. When a user wants to register using voice verification 906 (assuming that the user is already enrolled), the user will utilize the wireless microphone/headset (see 106, FIG. 1) or handheld microphone to repeat the specific utterances and allow the present invention to compare what was spoken in real-time and what was previously stored for that particular user. The user will be prompted with a window showing the specific utterances that must be spoken to achieve voice verification 906.

Any of the four (4) users may logon 904 to any of the four client computers (see 114, FIG. 1). A registration window enables the entire registration comprising user voice verification 906 and user selection 908 of a laser pointer (see 108, FIG. 1) projected image (see 112, FIG. 1) shape on the user's computer window (see 110, FIG. 1).

Registration 902 next comprises user selection 908 of a specific laser pointer (see 108, FIG. 1) projected image (see 112, FIG. 1) with a respective light pattern (shape). The user aims the laser pointer (see 108, FIG. 1) at the information display (see 100, FIG. 1) to allow the cameras (see 102, FIG. 1) to detect and identify the projected image (see 112, FIG. 1).

The present invention associates together the user identification from voice logon 904 and voice verification 906, and the respective projected image (see 112, FIG. 1) selected after voice logon 904 is complete.

Laser pointer (see 108, FIG. 1) projected image (see 112, FIG. 1) selection 908 associates a specific projected image (see 112, FIG. 1) pattern emitted by one of the four laser pointers (see 108, FIG. 1) with a respective user. Through the user's use of laser pointers (see 108, FIG. 1) that emit specific projected images (see 112, FIG. 1), the present invention can determine which user is commanding which application window (see 110, FIG. 1). In turn, the present invention can then determine the appropriate response. Image recognition determines which projected image (see 112, FIG. 1) is pointing at which application window (see 110, FIG. 1) and what the result of its pointing should be.

Laser Pointer Input

Two methods of interacting with an application window using the laser pointer (see 108, FIG. 1) include a pointer mode and a drawing mode. The pointer mode consists of using the laser pointer (see 108, FIG. 1) as a replacement for a conventional mouse with its left and right button clicking and positional pointing. The drawing mode consists of using the laser pointer (see 108, FIG. 1) to draw on and annotate the information display (see 100, FIG. 1).

The projected image (see 112, FIG. 1) of the laser pointer (see 108, FIG. 1) is detected 914 on the information display (see 100, FIG. 1) that is continually scanned by cameras (see 102, FIG. 1) behind the information display (see 100, FIG. 1).

The analog output of the cameras (see 102, FIG. 1) becomes the input to frame grabbers (see 118, FIG. 1) for conversion 916 to a digital format. The output of the frame grabbers (see 118, FIG. 1) is analyzed for pattern identification 918 by the image processing software (HALCON) residing on the image processing system, networked to respective computers. The image processing software performs template matching 919 of the information display image inclusive of the images of application windows (see 110, FIG. 1) detected by the cameras (see 102, FIG. 1) to a set of known templates of the projected image (see 112, FIG. 1) used.

If it is determined that no match occurs 919, the logic flow returns to determining 910 whether an input has been received from a laser pointer (see 108, FIG. 1) or from the user's voice. If a successful match occurs, the image processing software outputs 920 the corresponding template number if the cameras (see 102, FIG. 1) detect any features that match any of the known projected image (see 112, FIG. 1) light patterns (shapes) along with the spatial coordinate (x,y) location of the light pattern detected. The present invention then combines the user identification (ID) known from the user registration 902, the template number of the projected image (see 112, FIG. 1) light pattern and the spatial coordinate (x,y) location information of the light pattern and sends this information to the display controller (see 116, FIG. 1) so that the particular application window (see 110, FIG. 1) operation can be performed.

The template number and location is broadcast 922 to all client computers (see 114, FIG. 1). The relationship between the matched laser pointer (see 108, FIG. 1) projected image's (see 112, FIG. 1) light pattern and the user ID is retrieved 923 and used to perform the operation on the user's window 924. Processing then returns to determining 910 whether an input has been received from a laser pointer (see 108, FIG. 1) or from the user's voice.

Voice Command Input

If it is determined 910 that the user has spoken a voice command, speech contained in the input voice is recognized 926 in a recognition grammar created for that application window (see 110, FIG. 1) session. When a command is recognized 926, the corresponding window operation is performed 924. Processing then returns to determining 910 whether an input has been received from a laser pointer (see 108, FIG. 1) or from the user's voice. If a command is not recognized 926, processing again returns to determining 910 whether an input has been received from a laser pointer (see 108, FIG. 1) or from the user's voice. Voice recognition 926 is accomplished through the use of commercially available software and is not detailed in this invention.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. Method for local registration, enrollment and interaction with multiple-user information display systems at the same location by coordinating voice and optical inputs, comprising the following steps:

said user performing voice logon;
   said user performing voiceprint verification;
   implementing said verification by identifying an individual user via biometric voice pattern;
   said user selecting a unique light pattern to project onto an information display;
   said user projecting said unique light pattern onto said information display;
   associating said user's verified voiceprint with said user's projected light pattern, thereby identifying the user, using a specific light pattern, through the user's voice;
   said association allowing the system to detect which pointer belongs to which user;
   determining whether said user's command is from said unique light patterns, from said user's voice, or from a combination of both,
   when accepting a user's command from said unique light pattern:
      detecting the image of said unique light pattern;
      digitizing said detected image;
      identifying the pattern of said digitized said detected image;
      matching said identified pattern to known templates, outputting template number;
      broadcasting said template number and said identified pattern's location to all client computers;
      associating said template number and said user's voiceprint identification;
      performing an optically-commanded operation on said user's application window; and
      returning to said step of determining whether said user's command is from said unique light patterns or from said user's voice,
   when accepting a user's command from said user's voice:
      recognizing said user's voice command;
      verifying said user's voice command from said user's voiceprint;
      performing a voice-commanded operation on said user's application window; and
      returning to said step of determining whether said user's command is from said unique light patterns or from said user's voice,
   when accepting a user's command as a combination of said unique light patterns and said user's voice:
      detecting a location of a pointer; and
      implementing an action, at the location, via a voice command.

* * * * *